US006921182B2

(12) United States Patent
Anderson, Jr. et al.

(10) Patent No.: US 6,921,182 B2
(45) Date of Patent: Jul. 26, 2005

(54) EFFICIENT LED LAMP FOR ENHANCING COMMERCIAL AND HOME PLANT GROWTH

(75) Inventors: William Grant Anderson, Jr., Fallbrook, CA (US); Larry Stephen Capen, Oceanside, CA (US)

(73) Assignee: SolarOasis, Reno, NV (US)

( * ) Notice: Subject to any disclaimer, the term of this patent is extended or adjusted under 35 U.S.C. 154(b) by 0 days.

(21) Appl. No.: 10/437,159

(22) Filed: May 13, 2003

(65) Prior Publication Data

US 2004/0230102 A1 Nov. 18, 2004

(51) Int. Cl.[7] ................................................. F21V 9/00
(52) U.S. Cl. ....................... 362/231; 362/230; 362/805; 362/800
(58) Field of Search ................................. 362/231, 230, 362/227, 228, 805, 800, 2; 315/185 S, 200 A, 312, 316, 149, 150, 324

(56) References Cited

U.S. PATENT DOCUMENTS

| | | | | |
|---|---|---|---|---|
| 4,298,869 A | | 11/1981 | Okuno | 340/782 |
| 4,673,865 A | | 6/1987 | DeLuca et al. | 323/222 |
| 5,012,609 A | * | 5/1991 | Ignatius et al. | 47/1.01 R |
| 5,278,432 A | * | 1/1994 | Ignatius et al. | 257/88 |
| 5,660,461 A | * | 8/1997 | Ignatius et al. | 362/241 |
| 6,043,893 A | * | 3/2000 | Treiman et al. | 356/402 |
| 6,270,244 B1 | * | 8/2001 | Naum | 362/583 |
| 6,371,637 B1 | * | 4/2002 | Atchinson et al. | 362/555 |
| 6,474,838 B2 | * | 11/2002 | Fang et al. | 362/231 |
| 6,486,726 B1 | | 11/2002 | Worley, Sr. et al. | 327/514 |
| 6,504,301 B1 | | 1/2003 | Lowery | 313/512 |
| 6,602,275 B1 | * | 8/2003 | Sullivan | 607/88 |
| 6,688,759 B1 | * | 2/2004 | Hadjimichael | 362/405 |
| 2004/0109302 A1 | * | 6/2004 | Yoneda | 362/2 |

* cited by examiner

Primary Examiner—Tuyet Thi Vo
(74) Attorney, Agent, or Firm—Ian F. Burns

(57) ABSTRACT

A first set of orange LEDs with a peak wavelength emission of about 612 nanometers, a second set of red light emitting LEDs with a peak wavelength of about 660 nanometers, and blue light LEDs. Two beam spreads, 15° and 30°, were provided for both the 660 nm LEDs and 612 nm LEDs. When directed perpendicularly upon tops of the plant leaves, 10% light transmission occurred through the leaves for the 30° LEDs, and 80% light transmission for the 15° LEDs. Thus, fully 50% of the orange/red spectrum primarily used for photosynthesis was transmitted through the upper leaf canopy, making it available to support photosynthesis in leaves below. LED lamps are positioned at varying distances from the growing plants for controlling plant growth rates that vary with these distances, thereby to control plant inventory, because growth of plants can be greatly slowed to preserve them during periods of slow sales.

41 Claims, 7 Drawing Sheets

○ 660 nm 15°
△ 660 nm 30°
☆ 612 nm 30°
□ 612 nm 15°

EFFICIENT LED LAMP FOR ENHANCING COMMERCIAL AND HOME PLANT GROWTH

BACKGROUND OF THE INVENTION

The present invention relates to the field of growing plants.

For decades scientists have delved ever deeper into the inner workings of plants, and particularly into those processes which are driven by the chemical capture of light energy. At the same time, research into new methods for converting electricity into light of particular wavelengths has led some engineers to try to produce artificial lighting which promotes plant growth. Until recently this has meant modifying energy inefficient "white light" sources to produce more light at wavelengths known to promote plant growth and health. This hybrid technology, in which the bulk of the light from these augmented "plant grow lights" can't be used efficiently by plants, has dominated the market for four decades.

While electricity was abundant and cheap, these "old school" plant grow lights, based mainly on HID, high pressure sodium, or fluorescent style lamps, were acceptable despite their imperfections. But they still have many shortcomings. They typically convert only 10–15% of electrical energy into light, and only a very small portion of that light can be used by plants. Some of them, particularly the HID lamps, emit short wavelength UV light which is damaging to both the plants being grown under them and the people tending the plants. All of these lamps generate waste heat which must be eliminated to prevent damage to the plants they illuminate, adding to their operational cost. They contain environmentally damaging metals, are fragile, and have a short operating life.

As electricity supplies fail to keep pace with demand, leading to ever higher prices, the need for more efficient plant growing lights increases. The latest generation of high output LEDs, with their narrow light output wavelengths, are a good choice for creating the next generation of plant grow lighting. Most LED plant grow lighting systems available today can only be used in a laboratory. The others, while claiming to be useful to commercial plant growers, are merely modifications of the laboratory-specific systems.

To our knowledge, no one has yet developed an efficient LED-based plant growing light that is amenable to both home lighting design and commercial plant production. By designing our LED lamp as a bulb, which can be used in industry standard lighting fixtures, we have created a product that has universal appeal and marketability. Our lamp can be manufactured inexpensively with readily available parts for both home and commercial use.

Its preferred power source is the subject of our copending utility patent application Ser. No. 10/397,763 filed Mar. 26, 2003 and entitled USE OF TRACK LIGHTING SWITCHING POWER SUPPLIES TO EFFICIENTLY DRIVE LED ARRAYS.

A key part of our research involved the determination of which light frequencies or wavelengths would produce superior plant growth results. Each plant pigment absorbs light at one or more specific wavelengths. The areas of peak absorption for each pigment are narrow, and the measurements made with pigments concentrated in a test tube are different than those done on living plants. The wavelength of the light used determines it's energy level, with shorter wavelengths having greater energy than longer wavelengths. Thus each absorption peak, measured by the wavelength of light at which it occurs, represents an energy threshold that must be overcome in order for the process to function.

There are many peaks of light absorption in the pigments found in plants, and ideally it would be best to match them each with the most appropriate LED. But this is not practicable because of the limited desired area available in the lamp being designed, and because LEDs are not available in every wavelength of the spectrum. The compromise is to see what LEDs are readily available and match them, as well as one is able, to groups of closely matched pigment absorption peaks, while striving to meet the minimum requirements of plants for healthy growth.

Our patent searches turned up U.S. Pat. Nos. 5,278,432 and 5,012,609, both issued to Ignatius et al., who suggest LED plant radiation very broadly within bands 620–680 or 700–760 nm (red) and 400–500 nm (blue). After a year and a half of research, we settled on three more specific light wavelengths that produced the best plant growth results.

660 nanometers (nm) is the wavelength that drives the engine of the photosynthetic process. The 680 nm wavelength is perhaps closer to the peak absorption wavelength of one of the two chlorophylls found in higher plants. However, at 680 nm you miss completely the absorption curve of the second chlorophyll, and furthermore the output curve of a 680 nm LED has a fair amount of light output above 700 nm, which is known to cause unwanted morphological changes to plants. LEDs of 680 nm output are also rare in the marketplace, making them relatively expensive. Our choice of a 660 nm first wavelength component is a compromise wavelength commonly used in plant growing research, which supplies energy to both types of chlorophyll without emitting enough light above 700 nm to adversely affect plant growth.

The 620 nm LEDs used in the aforesaid Ignatius et al. patents, are meant to provide the light energy for photosynthesis, but a look at the absorption spectrum for the two chlorophylls shows that this wavelength falls almost entirely outside the absorption curve for chlorophyll.

Our research showed better results using LEDs of 660 nm and 612 nm rather than the wavelengths of 620 nm and 680 nm. Beneficially, LEDs of 660 nm are also readily available in the market, and are very inexpensive.

Our second 612 nm wavelength component was selected not to promote photosynthesis, but to match one of the peaks of the carotenoids. As noted in "Influence of UV-B irradiation on the carotenoid content of Vitis vinifera tissues," C. C. Steel and M. Keller (http://bst.portlandpress.com/bst/028/0883/bst028883.htm), "carotenoid synthesis . . . is dependent upon the wavelength of visible light, and is diminished under yellow and red filters."

By providing the orange 612 nm light, we not only promote creation of carotenoids, which are required for plant health, but also add a little to photosynthesis, since the carotenoids pass their absorbed energy to chlorophyll. Carotenoids are required for plant health due to their ability to absorb destructive free radicals, both from solar damage and from chlorophyll production, whose precursors will damage plant tissue in the absence of the carotenoids. During research we found that, beneficially, test plants turned a deeper green, i.e. produced more chlorophyll, with the addition of our 612 nm light component. This ability to increase a plant's chlorophyll content with this specific light wavelength is an important aspect of our invention.

Blue light of about 465 nm, this wavelength being non-critical, is strongly absorbed by most of the plant pigments, but is preferably included as the third component in our lamp to support proper photomorphogenesis, or plant development. Any LED near this wavelength will work as well, but the 470 nm LEDs are commonly available and less expensive than many other blue LEDs.

Regarding the proper proportion for each wavelength, it is known, from independent laboratory research, that a blue/red proportion of 6–8% blue to red is optimal. In sunlight the blue/red light proportion is about 30%, but this is not required by plants. More than 8% blue light provides no additional benefit, but adds to the cost of the device since blue LEDs are among the most expensive to manufacture. In our device we include about 8% blue light, which is near optimal for plant development while offering the greatest cost savings. Our research showed that best results were obtained when the output of the 612 nm orange LEDs in our device was added to the output of the 660 nm red LEDs when calculating our most desired blue/red proportion.

Our lamp is intended to deliver a well mixed blend of all three of the wavelengths used to the plant it is illuminating. Other devices which are intended to grow plants with LEDs solve this problem by creating alternating rows of each wavelength of LED used, with each LED string being composed of LEDs of the same wavelength. In these other devices, though, the LEDs are arranged in a square or rectangular block, matching the shape of the device itself In our case, with a circular design, this is not the most effective way to align the LEDs.

To improve the manufacturability of our circular lamp, it proved better to use LED strings that mixed wavelength, i.e. instead of putting the 660 nm LEDs into their own strings, we use strings that contain both 660 nm and 612 nm LEDs, and in one string use all three wavelengths. Normally this isn't done because it offers a greater potential for having a "current hogging" LED alter the string's designed operating characteristics. Current hogs can be a problem even when all of the LEDs in a string are of the same wavelength and manufacture, but when the string is composed of a mixture of wavelengths the chances of having this problem are increased. LED strings of mixed wavelength are to be used when the supplied voltage and current is tightly controlled.

Regarding prior art found during our searches, the mounting and plug in of an LED array light module in a MR-16 or the like fixture is disclosed in Lys U.S. Pat. No. 6,340,868 in FIGS. 20 and 21. Lyes teaches the use of these LED array modules for accelerating plant growth; see FIGS. 92A and 92B. Lys also teaches in FIG. 22 the use of a 24 volt DC module for energizing three LED strings connected in parallel. Lowrey U.S. Pat. No. 6,504,301 discloses an MR-16 outline package for a mixed wavelength LED arrangement; other lighting packages such as MRC-11 etc. are mentioned in his specification col. 7. Okuno U.S. Pat. No. 4,298,869 discloses a conventional lamp screw in fixture for three parallel LED strings of two volt LEDs supplied by 19.5 volts. The concept of placing the LEDs very close to the plants as they generate little heat is taught in col. 1 of U.S. Pat. No. 6,474,838.

BRIEF SUMMARY OF PREFERRED EMBODIMENTS OF THE INVENTION

We finally found that the proportion of twelve red 660 nm LEDs plus six orange 612 nm LEDs and one blue 470 nm LED was optimal. Our preferred circular lamp can hold two of these optimal sets of LEDs, resulting in a device with twenty-four red 660 nm LEDs, twelve orange 612 nm LEDs, and two blue 470 nm LEDs. Also, we used mixed LED strings that contained both types of LEDs for enhanced wavelength mixing.

We used LEDs having two beam spreads of 15° and 30°, in equal proportions, for both the 660 nm LEDs and 612 nm LEDs. When directed perpendicular to the upper surface of mature cotton plant leaves, we found that a quantum light sensor placed below the leaf registered 10% light transmission for the 30° LEDs, and 80% light transmission for the 15° LED, and fully 50% of the orange/red spectrum primarily used for photosynthesis was transmitted through the upper leaf canopy, making it available to support photosynthesis in leaves below.

Another aspect of our invention results in control of plant growth rates by selectively positioning our LED lamps emitting blue light at varying distances from the growing plants for controlling plant growth rates that vary in proportion with these distances. By adjusting plant growth rates we can control inventory; if current sales are slow, we can inhibit growth rates to preserve the properly sized continuously illuminated plants over greater extended time periods for later sales.

BRIEF DESCRIPTION OF THE DRAWINGS

Other features and advantages of the invention will become more apparent upon study of the following detailed description taken in conjunction with the drawings in which.

DETAILED DESCRIPTION OF PREFERRED EMBODIMENTS OF THE INVENTION

Figure 1:
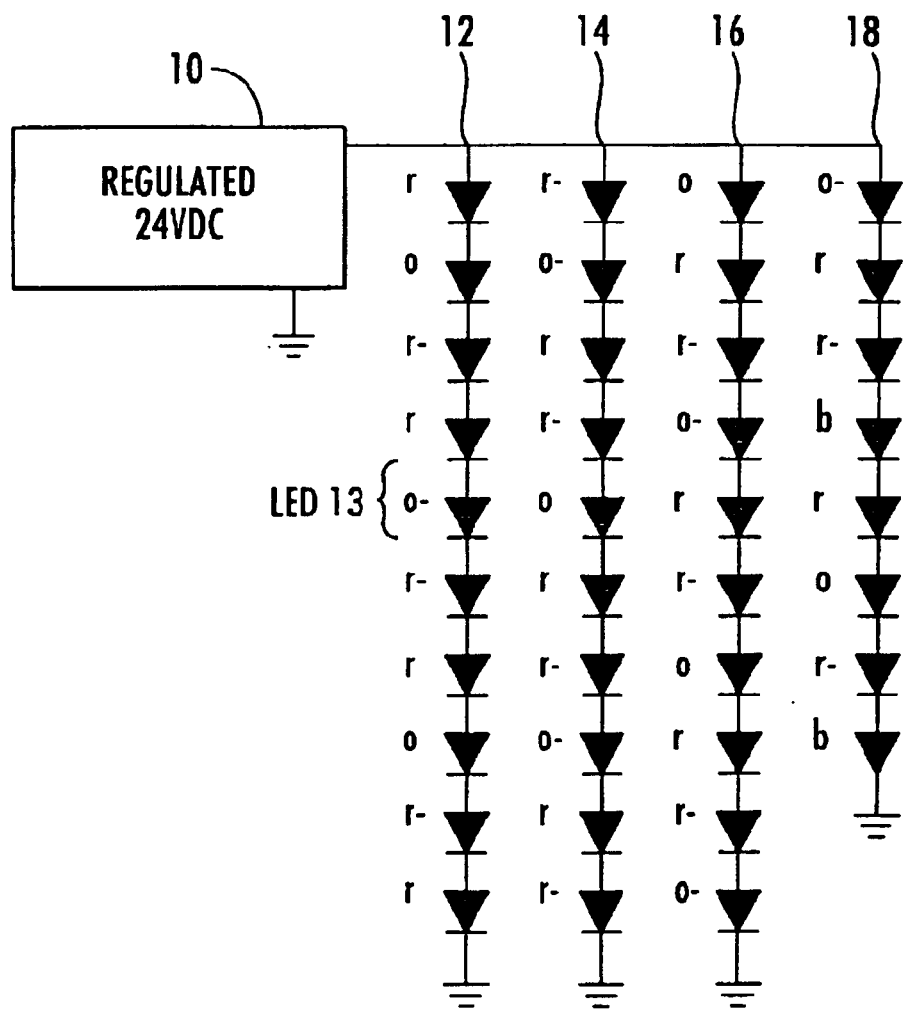
FIG. 1 discloses four strings of diodes coupled to the power supply.
Figures 2, 2A:
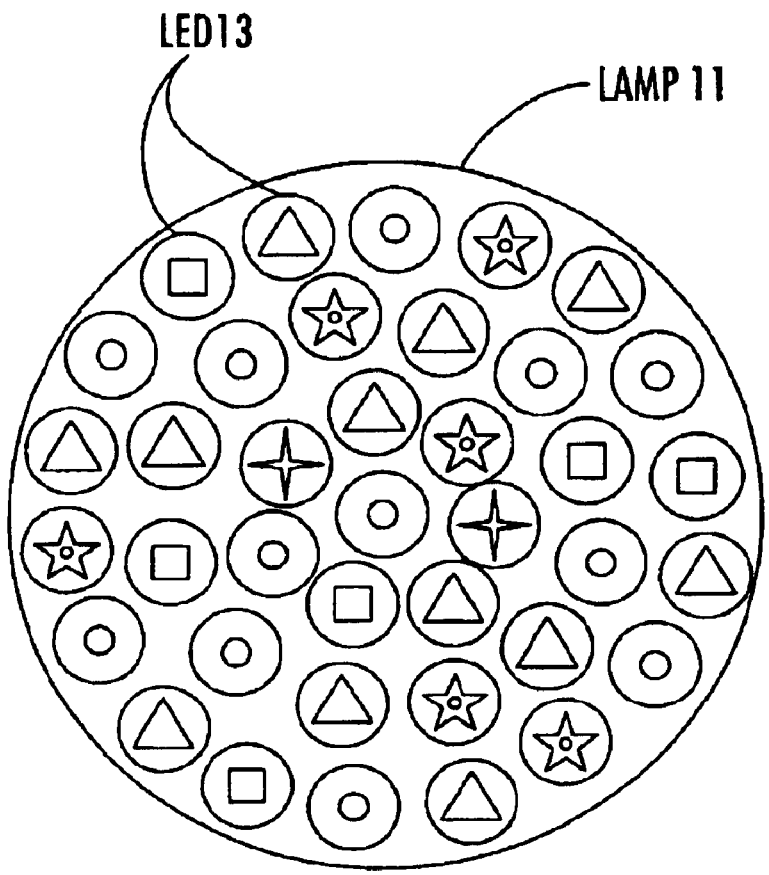
FIG. 2 discloses the diodes of FIG. 1 positioned within a circular lamp.
FIG. 2a discloses a table for use in understanding FIG. 2.

Five light wavelengths commonly known to match the absorption peaks of plant pigments were identified: 430 nm (blue, near ultraviolet), 450 nm–470 nm (blue), 570 nm (lime green), 610 nm (orange), and 660 nm (red). Our experimental efforts in turning theory into practice to select the best components, was anything but straightforward, and has taken the better part of a year to bring to its current level of development. Our final test results have allowed us to eliminate the 570 nm lime green LED. This left us with the following mix in our preferred embodiment:

12×660 nm (Red), 30° beam angle spread;
12×660 nm (Red), 15° beam angle spread;
6×612 nm (Orange), 30° beam angle spread;
6×612 nm (Orange), 15° beam angle spread; and
2×465 nm (Blue), 30° beam angle spread; all as shown in FIGS. 1, 2, and 2A.

We finally determined that the superior results we were seeing were not cause by the 570 nm green LEDs, and our results were substantially improved using the wavelength mix shown above. The number of variables we were testing made it difficult to isolate the exact effects caused by the different light wavelengths used, and it has only just become apparent that the 570 nm light wavelength was superfluous.

Research into plant growth using this final light frequency mix showed it gave superior results over our earlier research. The plants grown, particularly cotton and miniature roses, became dark green (i.e. generated large amounts of chlorophyll), had broad rather than narrow leaves, maintained healthy leaves in the understory of the leaf canopy, and had short leaf internodes, while growing vigorously.

Figure 3:
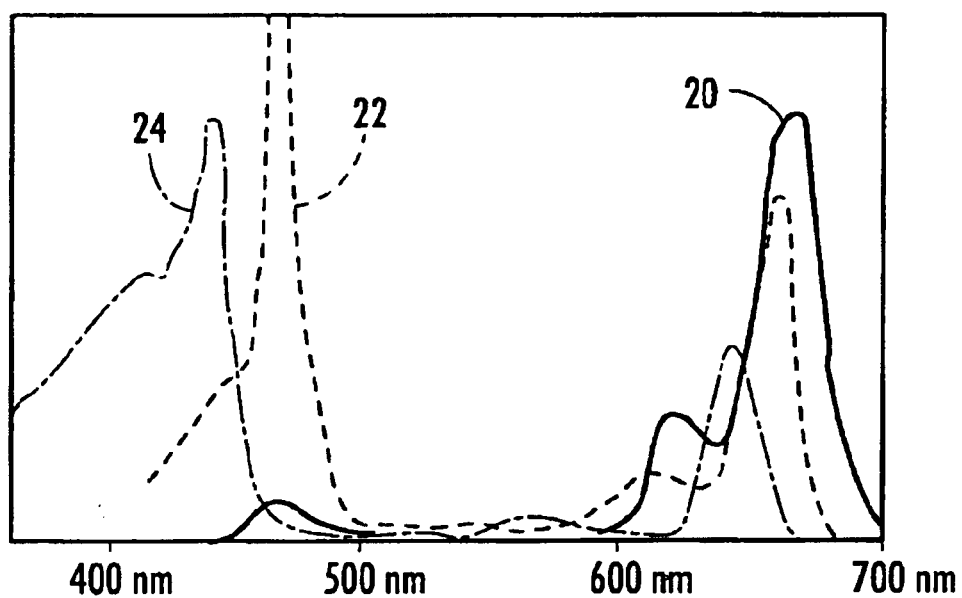
FIG. 3 discloses a graph showing a curve of the wavelength spectrum of the lamp output of our invention in its preferred embodiment.

The graph of FIG. 3 shows a solid line curve 20 of the wavelength distribution output of our invention in its preferred embodiment compared to the absorption spectrum curve 24 of chlorophyll A and absorption curve 22 of chlorophyll B 22, the wavelengths which most efficiently drive photosynthesis range between 600 nm and 700 nm, which closely matches the output peaks of our invention. Even though chlorophyll has its strongest absorption in the blue wavelengths, these wavelengths are very inefficient for driving the photosynthetic processes. The small amount of blue in our invention, is not used to drive the photosynthetic process, but is instead used to promote proper plant morphology. Thus, our final LED wavelength mix covers the absorption peaks for both chlorophyll A and chlorophyll B. The 465–470 nm LEDs also supply energy to the two chlorophylls, as well as the carotenoids, but inefficiently. The main purpose of the 465 nm light is to support photomorphology, promoting a short, compact growth pattern, broad leaves, and thick stems. The amount of blue light (460 nm to 470 nm) provided is optimally 6% to 8% of the provided amount of orange/red light within the 600 nm to 700 nm range. Sunlight is approximately 30% light in the blue portion of the spectrum, but it has been shown by university researchers that amounts higher than 8% provide no additional benefit.

As shown in FIG. 1, our preferred circular lamp embodiment contains thirty-eight LEDs, as follows: 12 narrow beam angle red LEDs labeled r, 12 wide beam angle red LEDs labeled r-, 6 narrow beam orange LEDs labeled o, 6 wide beam orange LEDs labeled o-, and 2 wide beam blue LEDs labeled b.

The circuit of FIG. 1 for driving the LEDs includes regulated 24 volt DC power source 10 that supplies three strings often LEDs, 12, 14, and 16, and one string of eight LEDs 18. Each string contains a mix of the LED wavelengths and beam spreads used in the invention, denoted 'r' for 15° beam spread 660 nm (narrow beam red), 'r-' for 30° beam spread 660 nm (wide beam red), 'o' for 15° beam spread 612 nm (narrow beam orange), 'o-' for 30° beam spread 612 nm (wide beam orange), and 'b' for 30° beam spread 465 nm (wide beam blue).

FIG. 2 schematically indicates a typical spatial distribution of the LEDs 13 of FIG. 1, as viewed looking into circular lamp 11 containing the LEDs. FIG. 2, along with the table of FIG. 2a, indicates the peak wavelengths and beam angles of light emission from the various LEDs in a typical arrangement for providing good mixing.

LEDs are manufactured to emit light with a particular viewing angle, or beam spread. Typically the narrower the beam spread the higher the light pressure or intensity produced, and vice versa. If the beam spread is too narrow, the light from adjacent LEDs may not overlap, leaving gaps in the illumination area. For a plant growing light this would not be appropriate. Conversely, if the beam spread is too wide, the illumination area will be too large, covering areas beyond the plant's leaf canopy, so a great deal of light will be wasted. We selected LEDs which would, in our preferred embodiment for general use, provide a circle of illumination approximately 10–12 inches wide at a distance of ten inches from the light source. Since our preferred embodiment is smaller than 3" in diameter, 100% illumination coverage of many size areas for commercial use and in the home is possible.

Growers employing artificial light sources for growing plants are cautioned to use fluorescent lighting only for seedlings, and to switch to High Intensity Discharge or High Pressure Sodium lamps after the plants are 12" to 18" tall. Fluorescent lighting is preferred because of its lower energy cost, but it has such a low light output that none of the light striking the upper leaf canopy can penetrate to the lower leaves, causing spindly growth. HID and UPS lights produce adequate light to penetrate a number of layers of leaf canopy, but at a much higher energy cost. The high temperature of HID and HPS lighting (the quartz envelope of the bulb exceeds temperatures of 1500° F.) is also more dangerous for the immature stems and leaves of seedlings.

Unlike conventional light bulbs, LEDs are manufactured to produce a directed beam of light, with a viewing angle, or beam spread, ranging from as little as 5° to over 120°. We have taken advantage of this characteristic of LEDs to produce a plant growing light source which combines low power consumption with the ability to penetrate the upper leaf canopy and provide adequate light to lower leaf levels.

Figure 4:
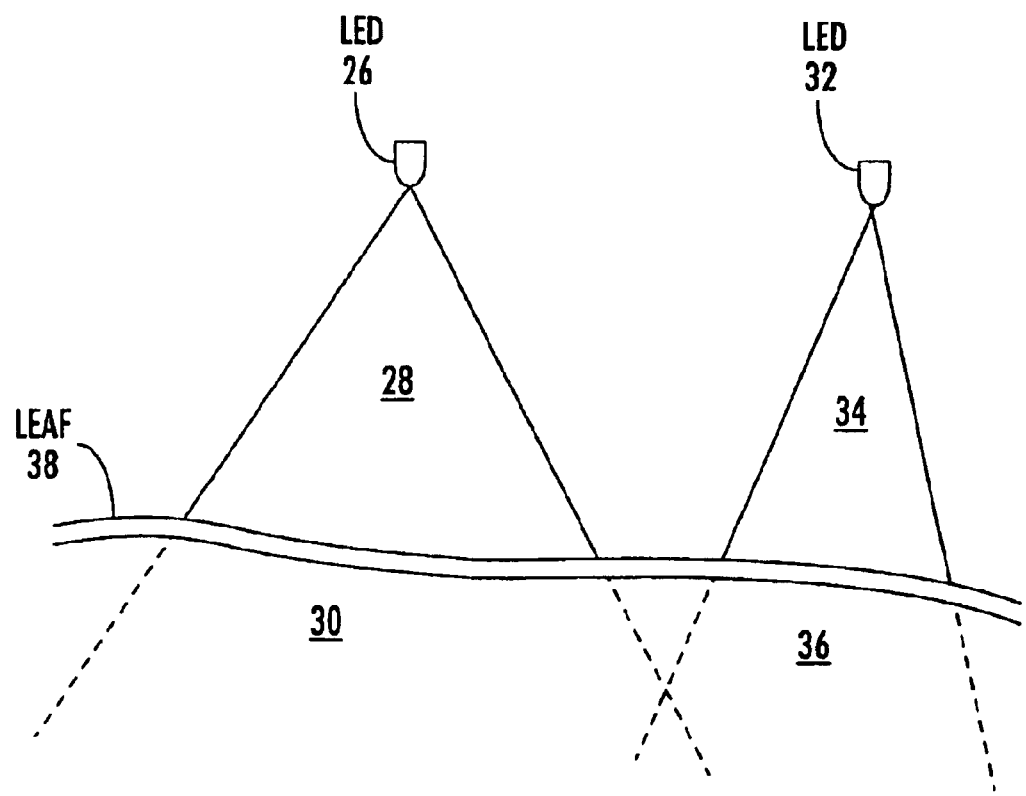
FIG. 4 illustrates the mixed beam spread feature of the invention.

As shown in FIG. 4, a wide beam LED 26 directs its light beam 28 onto the upper surface of a leaf 38. Measurements made at a point below the leaf 30 show only 10% of the light passes through the leaf to be available to the leaves below. A narrow beam LED 32 directs its light beam 34 onto the upper surface of leaf 38. In this case, measurements made at a point below the leaf at 36 show 80% of the light passes through the leaf to be available to the leaves below. When used in a 1:1 mix of wide to narrow beam LEDs, approximately 50% of the supplied light is available to the lower levels of the plant canopy. More specifically, we used two beam spreads, 15° and 30°, in equal proportions, for both the 660 nm LEDs and 612 nm LEDs. When directed perpendicular to the upper surface of mature cotton plant leaves, we found that a quantum light sensor placed below the leaf registered 10% light transmission for the 30° LEDs, and 80% light transmission for the 15° LEDs. Using our fully functional protoype described above, we found that fully 50% of the orange/red spectrum, primarily used for photosynthesis, was transmitted through the upper leaf canopy, making it available to support photosynthesis in leaves below.

These beam angles may vary somewhat depending on the distance of the plants from the lamps. For example, the lamp may be mounted upon the ceiling of a home and directed at a plant on a table. In this case the angles will be reduced from 30/15 degrees but the preferred ratio of beam angles of two to one will remain. Where the lamp is directly mounted upon an aquarium tank having plants therein for example, the beam spread angles could be increased rather than decreased.

At a distance of ten inches from a plant, the distance at which our tests were conducted, the lamp of FIGS. 1 and 2 produced a circle of light 10–12 inches in diameter. If a plant is placed below the lamp, only a part of the plant is within the circle of light and the rest of the plant is outside, the portions of the plant outside the light would be expected to grow taller and bend towards the light. As seen in our research, this undesired result did not happen with plants grown under our lamp. Instead, the portions of the plant outside the circle of light simply stopped growing but remained healthy. It appears that if a portion of a plant receives sufficient blue light at 470 nm, undesired stem elongation is inhibited for the entire plant. Our invention provides this effect, which can be useful in commercial plant growing applications where plants placed along the periphery of the illumined area may be only partially beneath the light. As long as a plant is at least partially illuminated by one of our lights it will remain healthy without showing the morphology typical of under-illuminated plants (strong phototropism and unwanted stem elongation).

Figure 5A:
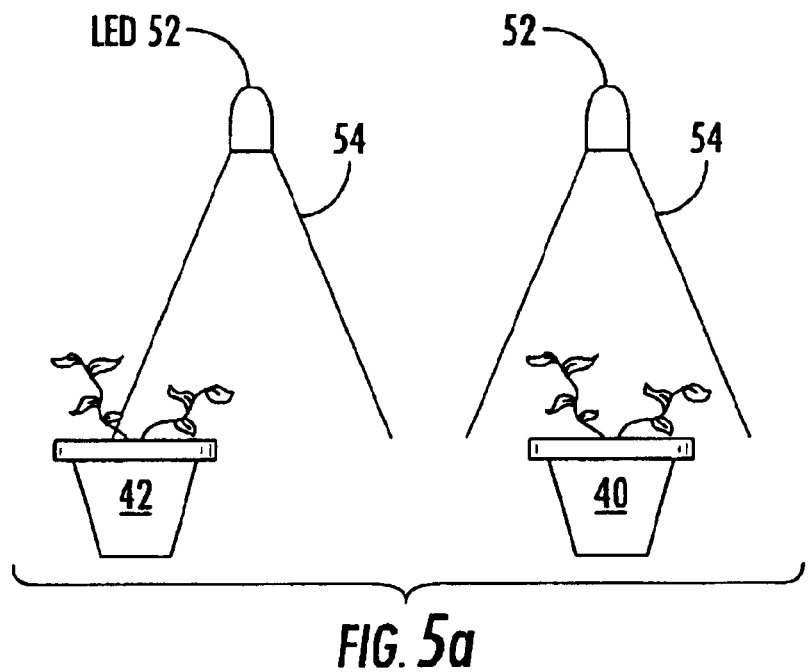
FIGS. 5a and 5b, 6, and 7a and 7b, show various aspects of controlling growth rates employed in connection with the invention.
Figure 5B:
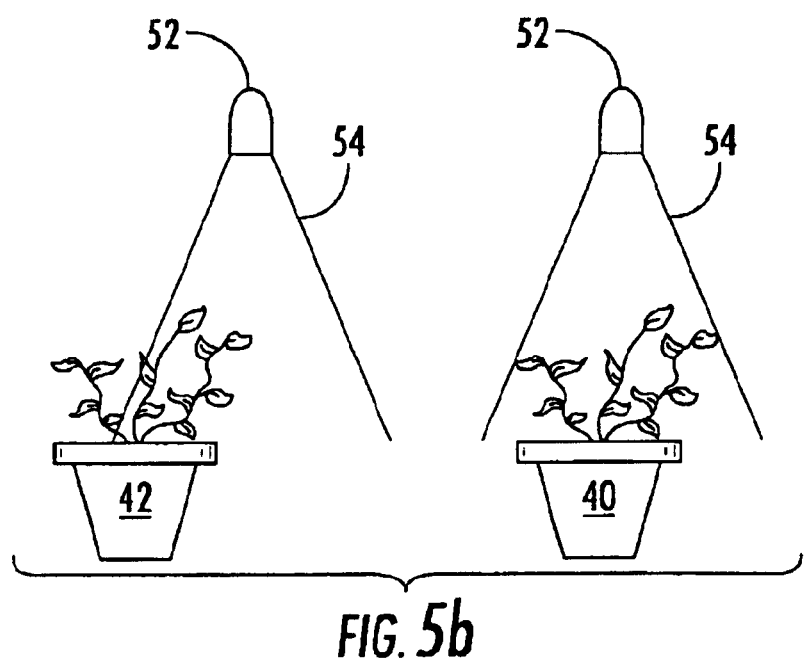

FIG. 5A shows two potted plants growing under our lamp to illustrate this effect. At time A, a plant 40, which is completely within the illumination area 54 of the light 52, is the same size as another plant 42 which is only partially within the illumination area 54 of the light 52. In FIG. 5B, at time B, the first plant 40 has grown uniformly, while only the portion of the second plant 42 within the cone of light 54 from light 52 has grown. The portion of the second plant 42 outside the light 54, while unchanged, is still healthy. This effect can be shown over a period of several weeks.

Inventory Control by Adjusting Plant Growth Rate

It is known that the amount of 470 nm blue light reaching a plant affects its morphology, i.e. a low amount of 470 nm light produces longer stem internodes, while a larger amount of 470 nm light produces shorter stem internodes. It is also known that because LED lighting is much cooler than conventional plant lighting sources, an LED-based plant light can be placed much closer to a plant than a conventional plant light, with a resulting increase in light intensity falling on the plant's leaves. We found that plants tend to grow to within an inch or so of the light, slowing as they approach the lamp (i.e. the stem internode length continues to decrease as the light intensity increases when the plants grow closer to the light source), until they nearly stop growing when within an inch or so of the lights. This is an important feature of our invention for commercial plant growing operations, where plants which overgrow their pots can't be sold and are typically discarded. Thus, this feature of our invention would allow a commercial greenhouse to maintain their plants at their optimum size for an extended period simply by lowering the lights to a point near the tops of the plants.

Figure 6:
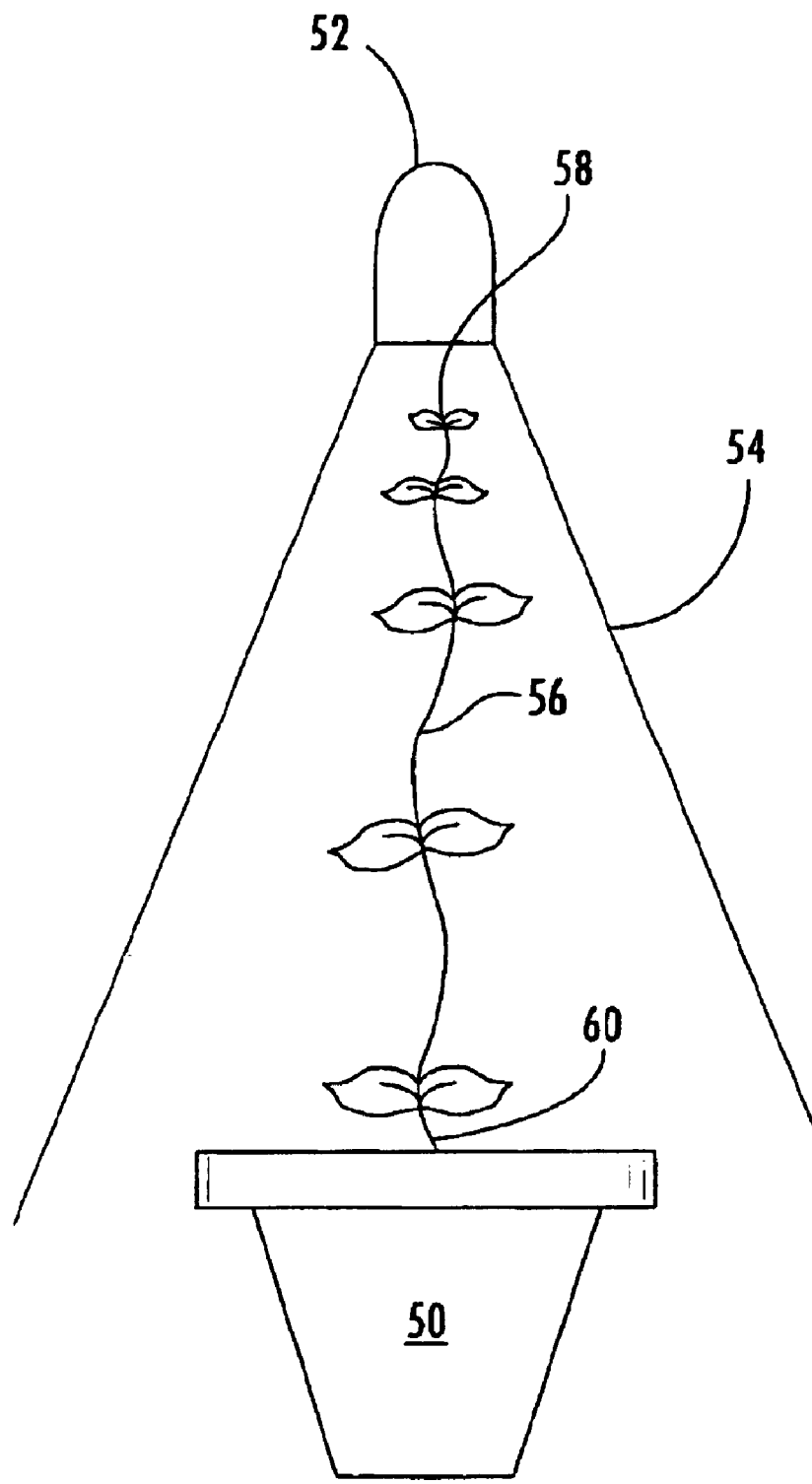

FIG. 6 shows a potted plant 50 growing within the light cone 54 produced by our lamp 52. The lower internode 56 is much longer than the internode at the top of the plant 58, which is approximately two inches from our lamp 52. The amount of 470 nm light the plant is receiving at its tip 58 is at least seventy times more intense than what it receives at its base 60. The internodes then become so small the plant's height changes only very slowly over time.

Figure 7A:
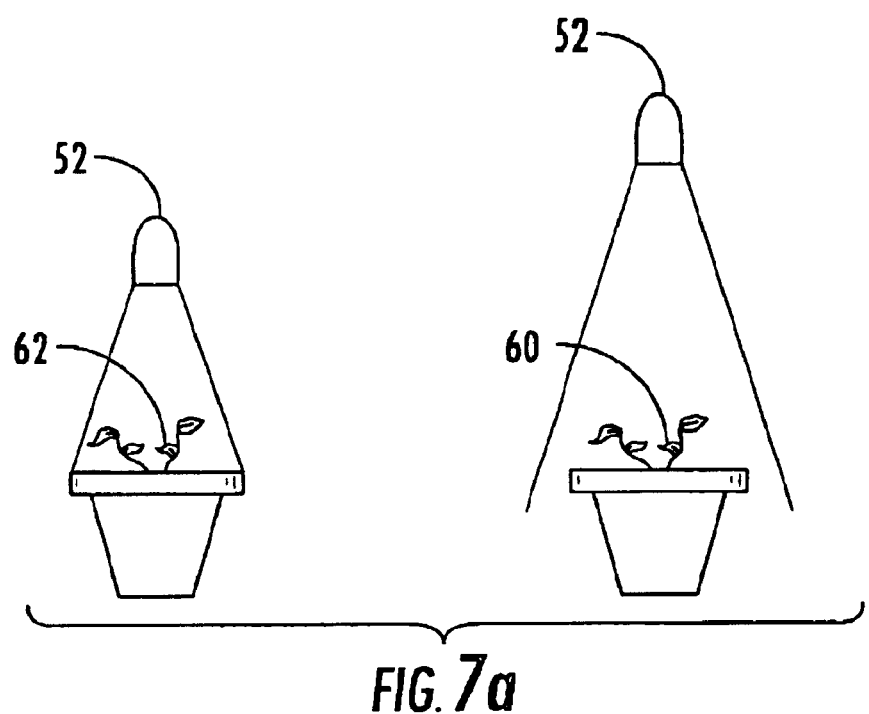
Figure 7B:
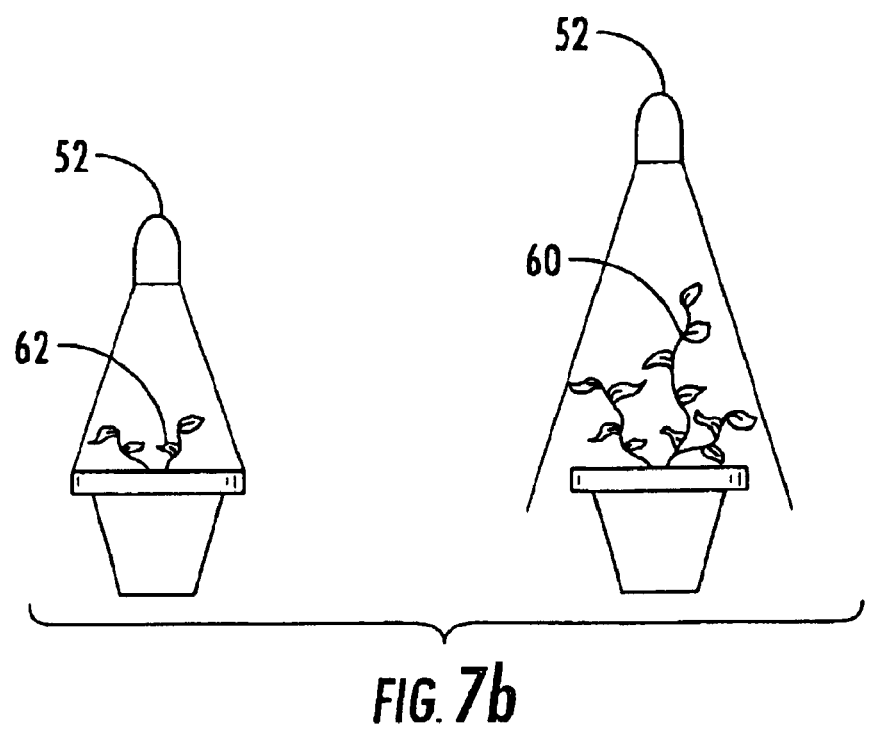

As shown in FIG. 7-A, at time A, the light source 52 over the first plant 62 is lowered close to the plant, while the light source 52 over the second plant 60 is not. As shown in FIG. 7-B, at time B, which may be several weeks later, the first plant 62 shows little change in size, while the second plant 60 has grown considerably during the same time period. The difference is the greatly increased amount of 470 nm blue light reaching the first plant 62, which shortens the internode stem length, thus keeping it short. This feature will allow commercial plant growers to "hold" the size of plants, if necessary, until they can be shipped. Otherwise, they would overgrow their pots and be spoiled. The resulting inventory control is of course of great importance in running a plant growing business.

Thus, during an extended time period of typically several weeks, we selectively position our LED lamps having a substantial amount of blue light at varying distances from growing plants for controlling plant growth rates that vary with said distances. This takes advantage of the property of LEDs to remain cool so that they can be positioned close to the tops of the plants as described above.

Since variations of the foregoing may be apparent to the worker in the art, the scope of the invention is to be limited solely to the terms of the following claims and equivalents thereof.

We claim:

1. A lamp for facilitating plant growth comprising:
   (a) a first set of orange light emitting diodes (LEDs) having a peak wavelength emission of about 612 nanometers (nm); and
   (b) a second set of red light emitting diodes (LEDs) having a peak wavelength emission of about 660 nm.

2. The lamp of claim 1 wherein about half of th LEDs of the first and second set of LEDs have a beam spread angle of about thirty degrees and the remaining half of the LEDs of said first and second set of LEDs have a beam spread angle of about fifteen degrees.

3. The lamp of claim 1 wherein about half of the LEDs of said lamp have a given beam angle spread and the remaining half of the LEDs have a second beam angle spread of about double the first beam angle spread.

4. The lamp of claim 1 wherein said LEDs are arranged in serial strings of LEDs of mixed light emitting wavelengths.

5. The lamp of claim 1 wherein the total light output of th first set of LEDs is about half the total light output of the second set of LEDs.

6. The lamp of claim 5 wherein about half of th LEDs of th first and second set of LEDs have a beam spread angle of about thirty degrees and the remaining half of the LEDs of said first and second set of LEDs have a beam spread angle of about fifteen degrees.

7. The lamp of claim 5 wherein about half of th LEDs of said lamp have a given beam angle spread and the remaining half of the LEDs have a second beam angle spread of about double the first beam angle spread.

8. The lamp of claim 5 wherein said LEDs are arranged in serial strings of LEDs of mixed light emitting wavelengths.

9. The lamp of claim 1 including a third set of LEDs emitting blue light.

10. The lamp of claim 9 wherein about half of the LEDs of the first and second set of LEDs have a beam spread angle of about thirty degrees and the remaining half of the LEDs of said first and second set of LEDs have abeam spread angle of about fifteen degrees.

11. The lamp of claim 9 wherein about half of the LEDs of said lamp have a given beam angle spread and the remaining half of the LEDs have a second beam angle spread of about double the first beam angle spread.

12. The lamp of claim 9 wherein said LEDs are arranged in serial strings of LEDs of mixed light emitting wavelengths.

13. The lamp of claim 9 wherein the total light output of the third set of LEDs is about eight percent of the total light output of the LEDs of the first and second set of LEDs.

14. The lamp of claim 13 wherein about half of the LEDs of the first and second set of LEDs have a beam spread angle of about thirty degrees and the remaining half of the LEDs of said first and second set of LEDs have a beam spread angle of about fifteen degrees.

15. The lamp of claim 5 including a third set of LEDs emitting blue light.

16. The lamp of claim 15 wherein about half of the LEDs of the first and second set of LEDs have beam spread angle of about thirty degrees and the remaining half of LEDs of said first and second set of LEDs have a beam spread angle of about fifteen degrees.

17. The lamp of claim 15 wherein about half of the LEDs of said lamp have a given beam angle spread and the remaining half of LEDs have a second beam angle spread of about double the first beam angle spread.

18. The lamp of claim 15 wherein the total light output of the third set of LEDs is about eight percent of the total light output of the LEDs of the first and second set of LEDs.

19. The lamp of claim 18 wherein about half of the LEDs of the first and second set of LEDs have a beam spread angle of about thirty degrees and the remaining half of the LEDs of said first and second set of LEDs have a beam spread angle of about fifteen degrees.

20. A lamp for facilitating plant growth comprising:
   (a) a lamp housing;
   (b) a first set of orange light emitting diodes mounted in the housing and having a peak wavelength of about 612 nanometers;
   (c) a second set of red light emitting diodes mounted in the housing and having a peak wavelength of about 660 nanometers; and
   (d) a third set of blue light emitting diodes mounted in the housing and having a peak wavelength of about 465 nanometers, wherein the first, second and third sets of light emitting diodes in combination output light that stimulates plant growth.

21. The lamp of claim 20, wherein for every orange light emitting diode there are two red light emitting diodes.

22. The lamp of claim 20, wherein for every blue light emitting diode there are twelve red light emitting diodes.

23. The lamp of claim 20, wherein for every blue light emitting diode there are six orange light emitting diodes.

24. The lamp of claim 20, wherein the first set of orange light emitting diodes includes a first set of 30 degree beam angle light emitting diodes and a second set of 15 degree beam angle light emitting diodes.

25. The lamp of claim 20, wherein the second set of red light emitting diodes includes a first set of 30 degree beam angle light emitting diodes and a second set of 15 degree beam angle light emitting diodes.

26. The lamp of claim 20, wherein the third set of blue light emitting diodes have a 30 degree beam angle.

27. The lamp of claim 20, wherein the first set of orange light emitting diodes comprise 24 orange light emitting diodes, the second set of red light emitting diodes comprise 12 red light emitting diodes and the third set of blue light emitting diodes comprises 2 blue light emitting diodes.

28. The lamp of claim 20, wherein the first set of orange light emitting diodes promote the creation of carotenoids in plants.

29. A lamp for facilitating plant growth, the lamp adapted to be connected to a power source, the lamp comprising:
   a plurality of strings of light emitting diodes, each string of light emitting diodes having alternating light emitting diodes chosen from the group consisting of:
   (a) orange light emitting diodes having a peak wavelength around 612 nanometers and a beam angle of 30 degrees;
   (b) orange light emitting diodes having a peak wavelength around 612 nanometers and a beam angle of 15 degrees;
   (c) red light emitting diodes having a peak wavelength around 660 nanometers and a beam angle of 30 degrees;
   (d) red light emitting diodes having a peak wavelength around 660 nanometers and a beam angle of 15 degrees; and
   (e) blue light emitting diodes having a peak wavelength around 465 nanometers and a beam angle of 30 degrees.

30. The lamp of claim 29, wherein for every orange light emitting diode there are two red light emitting diodes.

31. The lamp of claim 29, wherein for every blue light emitting diode there are twelve red light emitting diodes.

32. The lamp of claim 29, wherein for every blue light emitting diode there are six orange light emitting diodes.

33. The lamp of claim 29, wherein the power source is 24 volts direct current.

34. A method of manufacturing a lamp comprising the steps of but, not necessarily in the order shown:
   (a) providing a plurality of orange light emitting diodes having a peak wavelength of about 612 nanometers;
   (b) providing a plurality of red light emitting diodes having a peak wavelength of about 660 nanometers;
   (c) providing a plurality of blue light emitting diodes having a peak wavelength of about 465 nanometers; and
   (d) mounting the orange, red and blue light emitting diodes into the lamp in a pre-determined combination.

35. The method of claim 34, wherein the light emitting diodes are mounted into a lamp housing.

36. The method of claim 34, further comprising placing the lamp adjacent a plant.

37. The method of claim 34, wherein the predetermined combination of light emitting diodes includes a ratio of 12 red to 6 orange to 1 blue light emitting diodes.

38. The method of claim 34, wherein the light emitting diodes have beam angles of either 15 or 30 degrees.

39. The method of claim 34, wherein the light emitting diodes are mounted in a predetermined orientation.

40. A lamp for facilitating plant growth comprising:
   (a) orange light generating means for generating orange light having a wavelength of about 612 nanometers;
   (b) red light generating means for generating red light having a wavelength of about 660 nanometers;
   (c) blue light generating means for generating blue light having a wavelength of about 465 nanometers; and
   (d) the orange, red and blue light generating means being adapted in combination to output light frequencies that stimulate plant growth.

41. The lamp of claim 40, wherein the lamp is selectively positioned from a plant in order to control the growth rate of the plant.

* * * * *